United States Patent [19]
Bernard

[11] Patent Number: 5,275,191
[45] Date of Patent: Jan. 4, 1994

[54] BALL VALVE

[76] Inventor: Brooks Bernard, P.O. Box 53014, Lafayette, La. 70505

[21] Appl. No.: 50,515

[22] Filed: Apr. 20, 1993

[51] Int. Cl.$^5$ ............................................. F16K 5/06
[52] U.S. Cl. ..................... 137/15; 137/315; 251/315 NT; 251/315 TR
[58] Field of Search ................. 137/315, 15; 251/315

[56] References Cited

U.S. PATENT DOCUMENTS

| | | | |
|---|---|---|---|
| 3,732,885 | 5/1973 | Allen | 251/315 X |
| 3,819,150 | 6/1974 | Kajrup | 251/315 |
| 4,681,133 | 7/1987 | Weston | 137/315 |

Primary Examiner—John C. Fox
Attorney, Agent, or Firm—William David Kiesel; Robert C. Tucker; Warner J. Delaune, Jr.

[57] ABSTRACT

An apparatus for repairing a ball valve is disclosed. Generally, the ball valve contains an inner diameter which receives a ball member, and a first and second passageway portions. The apparatus comprises a ball seat insert retainer, with the first end being attached to the inner diameter of the ball member. A seat having a first end and a second end, with the first end being angled to engage with the ball member. A seat holder is also disclosed for holding the seat. A spring can also be provided for biasing the seat into engagement with the ball seat insert retainer.

17 Claims, 5 Drawing Sheets

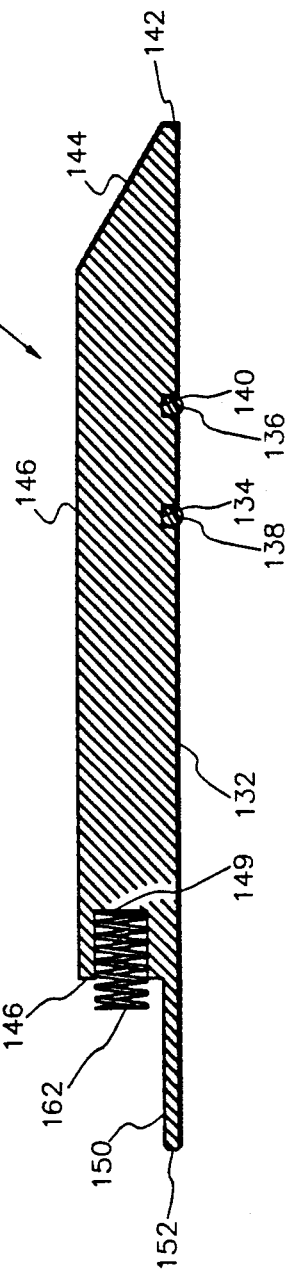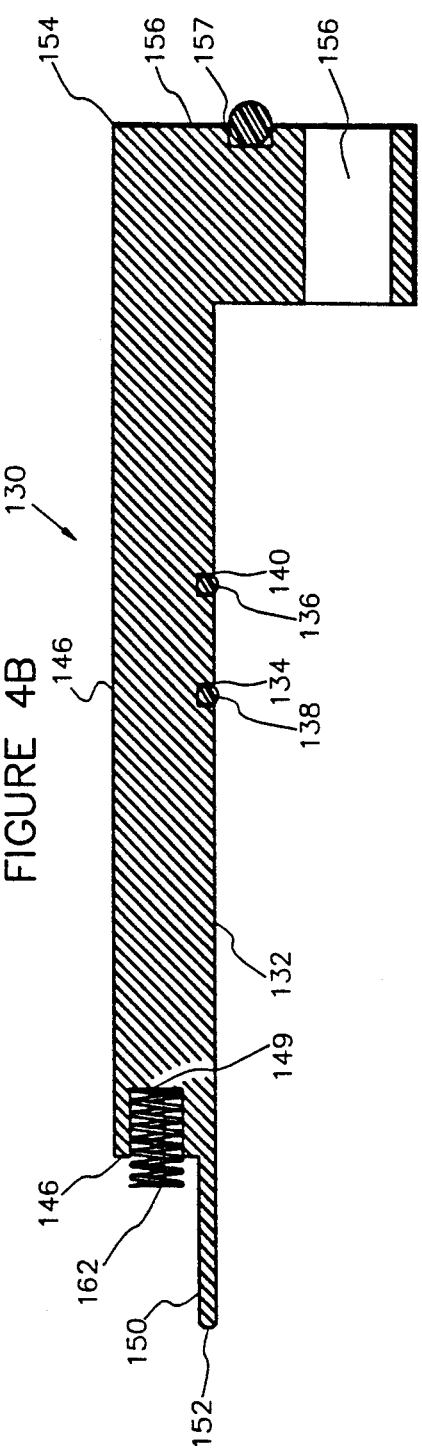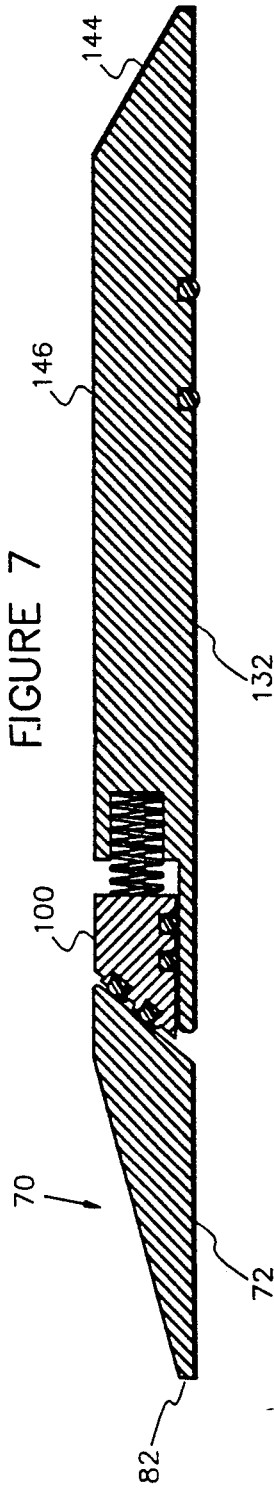

BALL VALVE

This invention relates to a fluid control apparatus known generally as a ball valve. More particularly, but not by way of limitation, this invention relates to an apparatus and method of repairing ball valves.

Ball valves are commonly used for opening and closing fluid communication in a flow line and generally include a spherical valve element. The opening and closing of the spherical valve element may be performed by a variety of mechanisms such as mechanical or pneumatic actuation.

In many industrial applications, such as the regulating of the flow of hydrocarbons in flow lines in production, refining and oil transportation industries, large diameter flow lines are necessary in order to provide for adequate flow rate. Consequently, the inner diameter of the spherical valve elements are usually large. Also, due to pressure testing requirements mandated by industry and government regulations, the body which houses the spherical valve element must be all one forged-body (also known as a welded-body ball valve), and not contain any portions which are threadedly connected. The welded-body ball valves generally comprise a forged body and ball, and exhibit the feature of being able to withstand high internal pressure.

Many times, the internal sealing mechanism on the welded-body ball valve will have to be replaced, or the spherical ball valve element seal area has become unsuitable for use as a sealing area. Heretofore, the repair of the seal means or seal area of these forged body valves has been very difficult in that the welds must be broken, and the spherical valve elements are physically removed, and the seal means are replaced or the seal area is refinished.

Furthermore, the repair of ball valves by breaking the welds is costly and complex, and many times technically and economically unsuccessful. Thus, the operators are forced to buy new valves instead of repairing the old valves, which is a very expensive alternative. Therefore, the present invention solves this problem by allowing the insertion of new seal means and preparing a new seal area thereby preventing the breaking of the welds contained on the housing of the ball valve.

SUMMARY OF THE INVENTION

The present invention contains claims to an apparatus and method for repairing a ball valve. Generally, the ball valve contains a housing member with a first entrance, and a second entrance, a rotatable ball valve element disposed within the housing member, a first passage connected with the first entrance, and a second passage connected with the second entrance, and a first seal means, located in the first entrance, for sealingly engaging the ball valve element, and a second seal means, located in the second entrance, for sealing engagement with the ball valve.

The apparatus for repairing a ball valve includes a seat member having a first angled side and a second side. The first angled side has seal means, disposed thereon, for sealingly engaging the seat member with the rotatable ball valve element.

The apparatus will also contain an assembly holder means for holding the seat member. The assembly holder will have a first end and a second end, with the first end receiving a biasing means for biasing the second side of the seat member away from the assembly holder. The second end of the assembly holder is attached to the first passage of the housing member. The biasing means can be a conical spring disposed about the first end of the assembly holder. The assembly holder may also contain seal means, disposed about said assembly holder, for sealingly engaging the assembly holder to the first passage of the housing member.

The apparatus may also include a retaining means, attached to the inner diameter of the ball valve element, for retaining the seat member in the assembly holder means. The retaining means will generally comprise a cylindrical ring having a first end and a second end, with the second end being chamfered so that the first angled end of the assembly holder and the chamfered end of the cylindrical ring cooperate.

In one embodiment, the assembly holder is rigidly attached to the first passage of the housing member by welding or some other equivalent means of attaching. In another embodiment, the assembly holder will contain an extended flange segment that is attached to the end of the first passage of the housing member.

A method of repairing a ball valve is also disclosed. The method generally comprises preparing the rotatable spherical ball valve member for a new seal area. Next, the ball seat insert retaining member is attached to the inner diameter of the rotatable ball valve member. A seat holder assembly is secured to the inlet passageway. The seat holder assembly will have a first and second side, the first side containing a seal means for sealingly engaging the rotatable ball valve member.

The method further comprises the steps of rotating the ball valve member in a closed position so that the seal means sealingly engage the ball valve member. In this position, the pressure will be increased from the inlet passageway side, and will be precluded from communicating with the outlet passageway. At this point, a pressure test of the valve is performed to confirm the seal, and if successful, the valve may be placed in service.

The method may also include rotating the ball valve member in the open position such that the ball seat insert retaining member is adjacent the outlet passageway. Thus, the ball valve element has been rotated in a position such that the seat is no longer biased against the retaining member. Next, the seat is placed in the inner diameter portion of the spherical ball valve member. The ball valve member is then rotated in the open position such that the ball seat insert retaining member is adjacent the inlet passageway. Thereafter, the seat is removed from the inner diameter portion of the ball valve member.

The method of repairing a ball valve may also include the steps of replacing the seat with a second new seat, or alternatively, repairing the old seat, and then positioning the new and/or repaired seat in the seat holder assembly. The second seat will have a first and second side, with a seal means for sealingly engaging the ball valve member located on the first side of the seat.

Subsequently, the ball valve member seat area is prepared so that a polished sealing area results that will cooperate with the replacement seat. The seat is then located in the seat holder assembly. The ball valve member is then rotated in the closed position, and the seal means can then be hydrostatically tested by applying pressure to the inlet passageway. Next, the ball valve is rotated in the open position such that the ball seat insert retaining member is adjacent the inlet passageway and the seat insert is biased against the retaining member.

A feature of the present invention includes the seat insert which contains the sealing means which allows for a new sealing insert. Yet another feature of the present invention includes the seat holder which will receive the seat insert. Still yet another feature includes the seal means contained on the seat holder in order to seal the seat holder to the ball member.

Another feature includes the use of a ball seat insert retainer ring which will be fitted on the inner diameter of the spherical ball valve element. Yet another feature includes the use of biasing means which will cooperate with the ball seat insert retainer ring to bias the seat insert into engagement against the retainer ring while the ball valve element is in the open position.

An advantage of the present invention includes the ability of installing a new seat insert on welded body ball valves. Another advantage is that the present invention will allow continued replacement and repair of the seat insert once it has been installed.

Still another advantage is that the seat holder can be welded to the passageway. Alternatively, the seat holder can contain an extended flange end, and the flange end can be attached to the end of the outer passageway. Still another advantage includes the preparation and use of a new sealing area on the spherical ball valve element.

BRIEF DESCRIPTION OF THE DRAWINGS

FIGS. 4A and 4B are vertical cross-section views of two embodiments of the seat holder of the present invention.

FIG. 7 is a vertical cross-section of the assembly.

DESCRIPTION OF THE PREFERRED EMBODIMENTS

Figure 1:
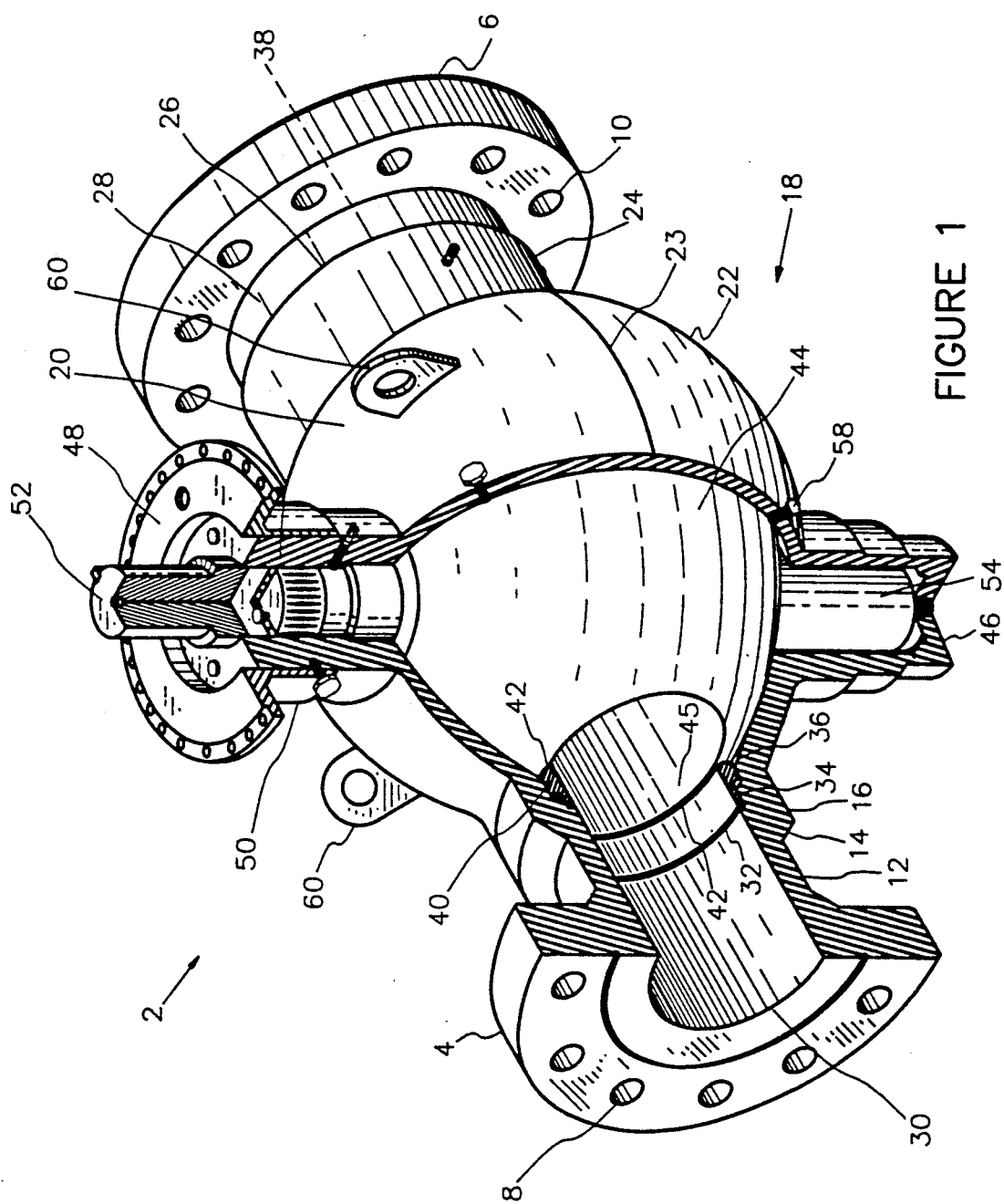
FIG. 1 is a perspective illustration of a typical ball valve.

Referring to FIG. 1, an illustration of a typical ball valve 2 is depicted. The ball valve 2 contains a first flange end 4 and a second flange end 6. The flange ends 4 and 6 contain a plurality of apertures 8 and 10 which will contain bolts (not shown) for attachment to a flow line (also not shown).

The flange end 4 continues to outer cylindrical surface 12, which in turn extends to angled shoulder 14. The angled shoulder 14 terminates at second cylindrical surface 16, which in turn extends to spherically shaped body 18. In one embodiment, the body 18 and the surface 16 are attached to one another by welding techniques know to those of ordinary skill in the art.

The body 18 may comprise a first forged half 20 and a second forged half 22 which are joined together to form a spherical shape. The first half 20 and second half 22 will be attached to one another generally by welding 23 the two together.

The body 18 will be attached to the outer cylindrical surface 24 which in turn terminates at the angled shoulder 26. The angled shoulder concludes at cylindrical surface 28, which in turn leads to the flange end 6.

Extending radially inward of the flange end 4 is the inner diameter surface 30 thereby forming a first (inlet) passage. The inner diameter surface 30 terminates at inwardly extending shoulder 32, wherein shoulder 32 extends to cylindrical surface 34, which in turn extends to groove 36. The first passage 30 and the body 18 are then attached to one another as previously described. The flange end 6 has a symmetrical inner diameter surface and a second (outlet) passage, represented at 38.

The floating seat ring 40 is received within the groove 36, and the floating seat ring 40 will have a face 42 that will engage with the spherical ball valve element 44 in order to provide a seal with spherical ball valve element 44. The element 44 will have a bore 45 for communication between the first and second passage. The second passage will have a similar floating seat ring, which is not shown, that will also provide a seal with the spherical ball valve element 44.

The body 18 may contain a trunnion cavity formed thereon at 46, and on the opposite end will have an actuator cover 48. The spherical shaped body 18 also has a passage 50 formed thereon for lateral placement of the activation means 52, which in one embodiment is a mechanical actuator. Attached to the spherical ball valve element 44 at both ends will be the trunnion 54.

The ball valve 2 may also contain an opening 56 for placement of body bleed fitting means 58 which is generally a nut, bolt and seal means so that pressure within the ball valve body 18 can be released by unscrewing the fitting means 58 as desired by the operator. Also, the body 18 may also contain eye fasteners 60 for aid in transportation and movement of the valve 2.

Figure 2:
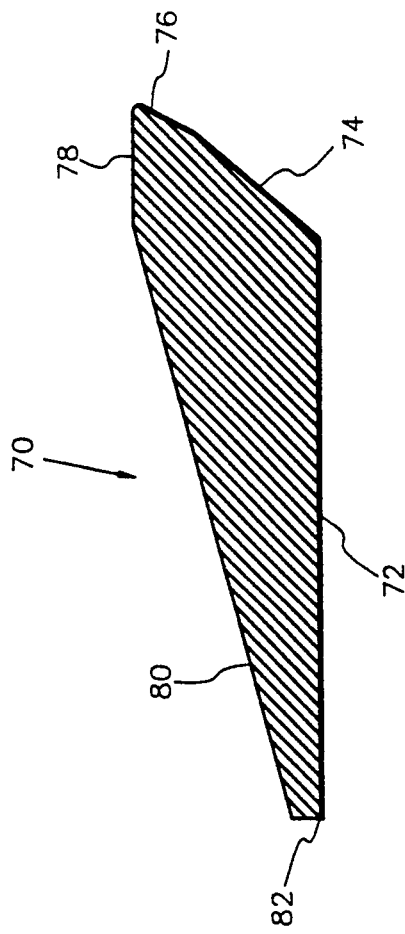
FIG. 2 is a vertical cross-section view of the ball seat insert retainer of the present invention.

Referring to FIG. 2, the ball seat insert retainer ring is seen generally at 70. The ring will have a generally cylindrical outer surface 72 that terminates at angled surface 74. The angled surface 74 extends to second angled surface 76. Extending from surface 76 is the inner diameter cylindrical surface 78, which in turn extends to chamfered surface 80, with the surface 80 concluding at radially flat surface 82. The outer cylindrical surface 72 will be positioned within the inner diameter surface 30 of the inlet portion of the valve member, and will have the end 82 attached to the inner diameter surface 30 by welding or other equivalent means. The operation of the device will be explained in greater detail later in the application.

Figure 3:
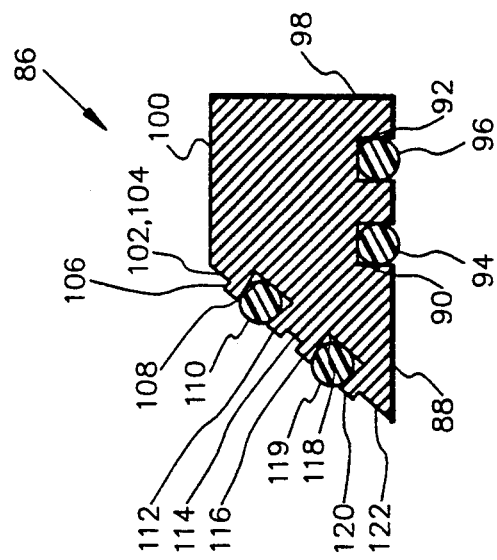
FIG. 3 is a vertical cross-section view of the seat insert of the present invention.

With reference to FIG. 3, the seat insert, seen generally at 86, will now be described. In the preferred embodiment, the seat will have a cylindrical outer surface 88 that will have contained thereon a first groove 90 and a second groove 92 for the placement of seal means 94 and 96. The surface terminates at radially flat surface 98, which will extend to inner diameter cylindrical surface 100, which will in turn extend to seat face surface 102.

The face 102 will have contained thereon a first surface 104 that extends to the bevelled shoulder 106, that will then have a groove 108 portion that contains a seal means 110, such as an elastomeric member. The groove portion will terminate at surface 112 which extends to lower surf ace 114, which in turn extends to raised surface 116, with surface 116 terminating at the groove 118. The groove portion 118, which will contain therein seal means 119, will terminate at surface 120, that will extend to the chamfered surface 122.

With reference to FIG. 4A, the seat holder 130 will now be described. Generally, the seat holder 130 contains an outer cylindrical surface 132 which will have formed thereon a first channel 134 and a second channel 136 for placement of an elastomeric seal means 138 and 140.

Extending radially inward of surface 132 is radially flat surface 142 which in turn extends to chamfered surface 144. The surface 144 extends to internal diameter cylindrical surface 146, which in turn concludes at radially flat surface 148. The surface 148, has contained thereon groove 149, terminates at cylindrical surface 150 that cooperates with seal means 94 and 96, which in turn stretches to end 152.

In FIG. 4B, a seat holder 154 is shown that has at one end 156 an extended flange section that will connect to the flange end 8. The flange end 156 will have ring groove 157 for placement of a ring, as well as opening 158 for placement of bolting means (not shown). The seat holder 154 is an alternative to the seat holder 130 depicted in FIG. 4A, with the difference being that end 156 is threadedly connected to the flange end rather than being rigidly attached by welding.

FIG. 7 depicts the assembly of the present invention.

OPERATION

Figure 5:
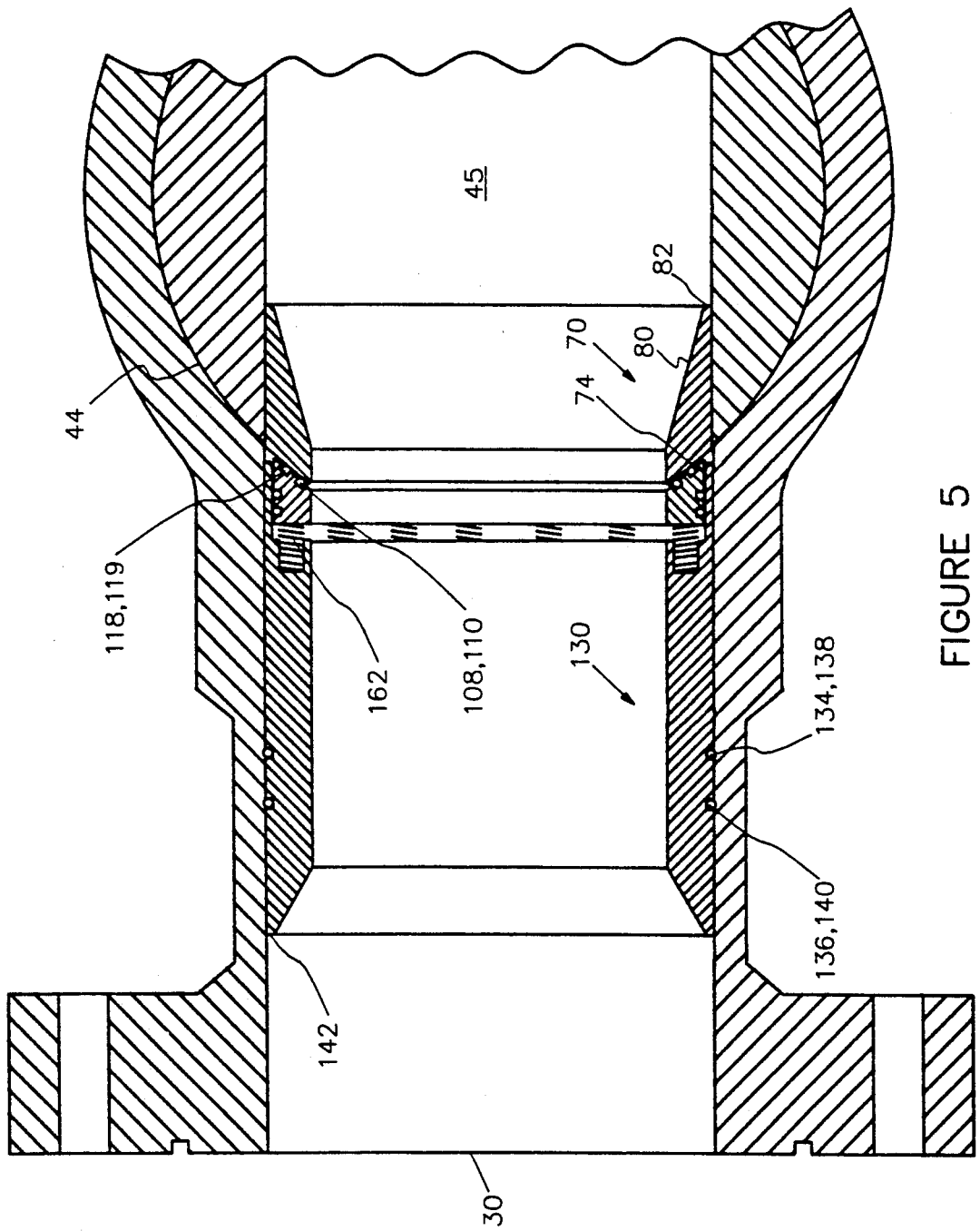
FIG. 5 is a vertical cross-section view of the present invention located within the ball valve when the spherical valve element is in the open position.

Referring to FIG. 5, the method of repairing the ball valve 2 will now be described. In FIG. 5, the spherical ball valve element 44 is in the open position. First, it will be necessary to prepare the new sealing area of the ball valve element by sanding the spherical surface. Note, that the area wherein the old seat ring 40 sealingly engaged the ball valve element 44 will not be the area wherein the new seat 86 will sealingly engage the ball valve element 44.

The ball seat insert retainer 70 will then be attached to the bore 45 of the valve element 44. The retainer 70 is used for retaining the seat member 86. In one embodiment, the retainer 70 will attached by welding the end 82 to the bore, but other means of attachment are available such as bolting. Next, the seat holder assembly 130 will be secured to the inlet passageway 30 by welding the end 142 to the inner diameter surface 30.

Figure 6:
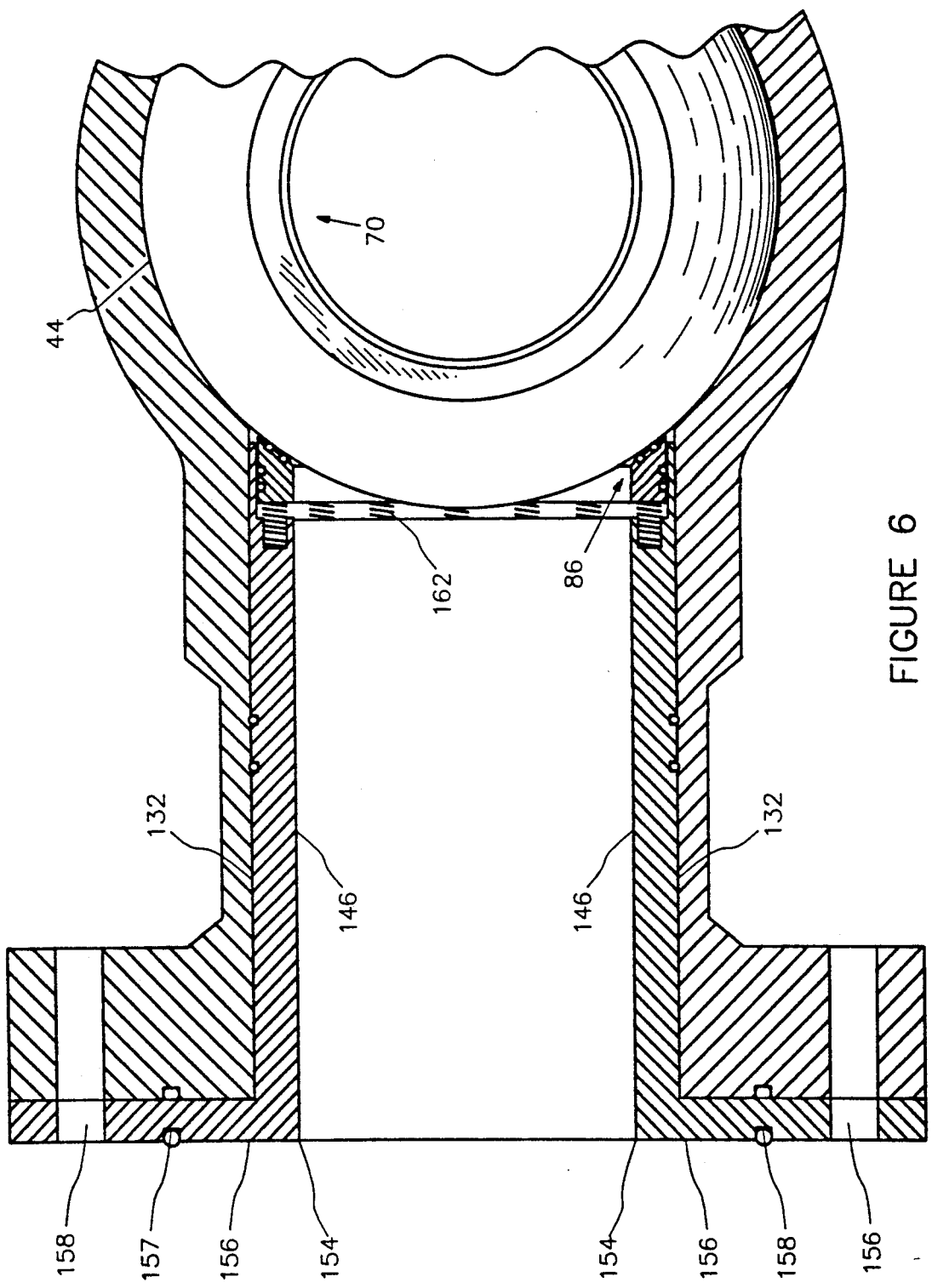
FIG. 6 is a vertical cross-section view of the present invention located within the ball valve when the spherical valve element is in the closed position.

Another embodiment is available, as depicted in FIG. 6, wherein the flange end 156 is attached to the outer sides of the ball valve flange end 4. This may be necessary when the operator deems it undesirable to weld on the inner diameter of the inlet passageway 30 for structural integrity reasons.

After securing the seat holder 130, the seat insert 86 and conical spring 162 will be placed within the surface 148, 149 so that the seat insert face 102 will be biased against and engage the angled surfaces 74,76 of the ball seat insert retainer ring 70. Thus, by having the retainer ring 70 in place, the seat insert 86 is precluded from dislodging into the bore 45.

Next, the ball valve element 44 is rotated in a closed position, as seen in FIG. 6. It should be noted that FIG. 6 depicts the embodiment wherein flange ends 156 extends from the surfaces 132 and 146. In the closed position, the seat face 102, and in particularly the seal means 110 and 119 will engage the new seal area of the ball element 44. Thus, a pressure test may be applied to the inlet passage 30, which will have the effect of creating a positive seal between the new seal area of the ball element 44 and the seat face 102. A positive seal is created because of the pressure acting against surface 98 of the seat insert 86.

After the seat insert has been in place and used, because of ordinary wear and tear, it may be necessary to replace the seat insert again. The invention of the present application allows for this feature. In order to replace the seat 86, the ball valve element 44 is rotated in an open position such that the ball seat insert retaining ring 70 is adjacent the outlet passage 38. Next, the seat insert 86 is placed into the bore 45. The element 44 is then rotated, with the seat insert 86 within the bore, such that the ball seat insert retaining ring 70 is adjacent the inlet passage 30. At this point, the seat insert 86 can be removed from the bore 45 of the valve element 44.

Thus, the seal means would be replaced or alternatively a new seat insert would be manufactured identical to seat 86 (the references to numbers of the seat as depicted in FIG. 3 will continue to be used). Next, the ball valve member 44 will be prepared by sanding the sealing area. The new seat insert with the spring 162 would be located within the seat holder assembly 130. Then, the ball valve member 44 is rotated in the closed position as depicted in FIG. 6. Thereafter, the seal between the ball element 44 and the seat insert 86 can be hydrostatically tested. The ball valve can then be placed in service by rotating the ball element to the open position and wherein the retaining ring 70 is adjacent the inlet passageway 30.

Changes and modifications in the specifically described embodiments can be carried out without departing from the scope of the invention which is intended to be limited only by the scope of the appended claims.

I claim:

1. An apparatus for repairing a ball valve, the ball valve having an inner diameter, and a first and second passageway portions comprising:
   - a ball seat insert retainer having a first end and a second end, with the first end being attached to the inner diameter of the ball member;
   - a seat having a first end and a second end, with the first end being angled to engage with the ball member, the first end further containing a grooved segment having contained therein elastomeric seal means for sealingly engaging with said ball member;
   - seat holder having an engagement end and an attachment end, the engagement end having a recess contained thereon, and the attachment end being attached to the first passageway of the ball valve;
   - biasing means, received within the recess of said seat holder, for biasing said seat into engagement with said ball seat insert retainer.

2. The apparatus of claim 1, wherein said ball seat insert retainer first end is rigidly attached to the inner diameter of the ball member, and the second end has a chamfered surface so that the first end of said seat and the second end of said retainer engage.

3. The apparatus of claim 2, wherein said biasing means is a conical spring.

4. The apparatus of claim 3 wherein said seat holder further comprising seal means for sealing engaging said seat holder to the first passageway of the ball valve.

5. The apparatus of claim 4, wherein the attachment end of said seat holder is rigidly attached to the first passageway of the ball valve.

6. The apparatus of claim 4, wherein the attachment end of said seat holder contains a flange member, and wherein said flange member is rigidly connected to said first passageway of the ball valve.

7. A method of repairing a ball valve, the ball valve containing a rotatable ball valve member having an inner diameter, an inlet passageway, an outlet passageway, and a first seal seat means for sealing the rotatable ball valve member in the inlet passageway, and a second seal seat means for sealing the rotatable ball valve member in the outlet passageway, the method comprising the steps of:

preparing the rotatable ball valve member for a new seal area;

attaching a ball seat insert retaining member to the inner diameter of the ball valve member, said retaining member having a first end and a second end, wherein the first end of the retaining member is attached to the inner diameter of the ball valve member;

securing a seat holder assembly in the inlet passageway, said seat holder assembly containing a seat having a first and second side, said first side of said seat containing a seal means for sealingly engaging said rotatable ball valve member.

8. The method of claim 7, further comprising the steps of:

rotating the ball valve member in a closed position so that said seal means of said seat sealingly engage the ball valve member;

testing the seal means by pressure testing the inlet passageway of the ball valve member.

9. The method of claim 8, further comprising the steps of:

rotating the ball valve member in the open position such that the ball seat insert retaining member is adjacent the outlet passageway;

placing the seat in the inner diameter portion of said ball valve member;

rotating the ball valve member in the open position such that the ball seat insert retaining member is adjacent the inlet passageway;

removing the seat from the inner diameter portion of said ball valve member.

10. The method of claim 9, further comprising the steps of:

replacing the seat with a second seat, said second seat having a first and second side, with a seal means for sealingly engaging the ball valve member located on said first side;

preparing the ball valve member seat area;

locating the seat in the seat holder assembly;

rotating the ball valve member in the closed position;

testing the seal means of the seat by pressure testing the inlet passageway of the ball valve member;

rotating the ball valve in the open position such that the ball seat insert retaining member is adjacent the inlet passageway.

11. In combination with a ball valve having a housing member with a first entrance, and a second entrance, a rotatable ball valve element disposed within said housing member and having an inner diameter, a first passage connected with the first entrance, and a second passage connected with the second entrance, and a first seal means, located in the first entrance, for sealingly engaging with the ball valve element, and a second seal means, located in the second entrance, for sealingly engaging with the ball valve, the assembly comprising:

a seat member having a first angled side and a second side, the first angled side having seal means for sealingly engaging said rotatable ball valve element;

an assembly holder having a first end and second end, with the first end receiving a biasing means for biasing against the second side of said seat member and said second end of said assembly holder being attached to the first passage of said housing member.

12. The ball valve of claim 11, further comprising:

retaining means, attached to the inner diameter of said ball valve element, for retaining said seat member when said rotatable ball valve element is in the open position.

13. The ball valve of claim 12, wherein said assembly holder is rigidly attached to the first passage of said housing member.

14. The ball valve of claim 12, wherein the second end of said assembly holder contains a flange segment, and wherein said flange segment is attached to the first passage of said housing member.

15. The ball valve of claim 14 wherein said retaining means comprises:

a cylindrical ring having a first end and second end, with the second end being chamfered so that the first angled end of the assembly holder and the chamfered end of the cylindrical ring cooperate.

16. The ball valve of claim 15 wherein said biasing means includes a conical spring disposed about the first end of said assembly holder.

17. The ball valve of claim 16 further comprising seal means, disposed about said assembly holder for sealingly engaging said assembly holder to the first passage of said housing member.

* * * * *